May 9, 1939.  E. L. SCHUMACHER  2,157,247
OPHTHALMIC MOUNTING
Filed Oct. 23, 1936
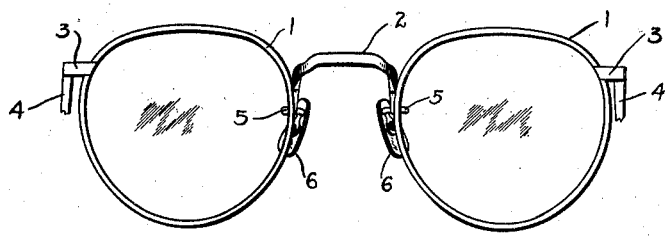
FIG. I
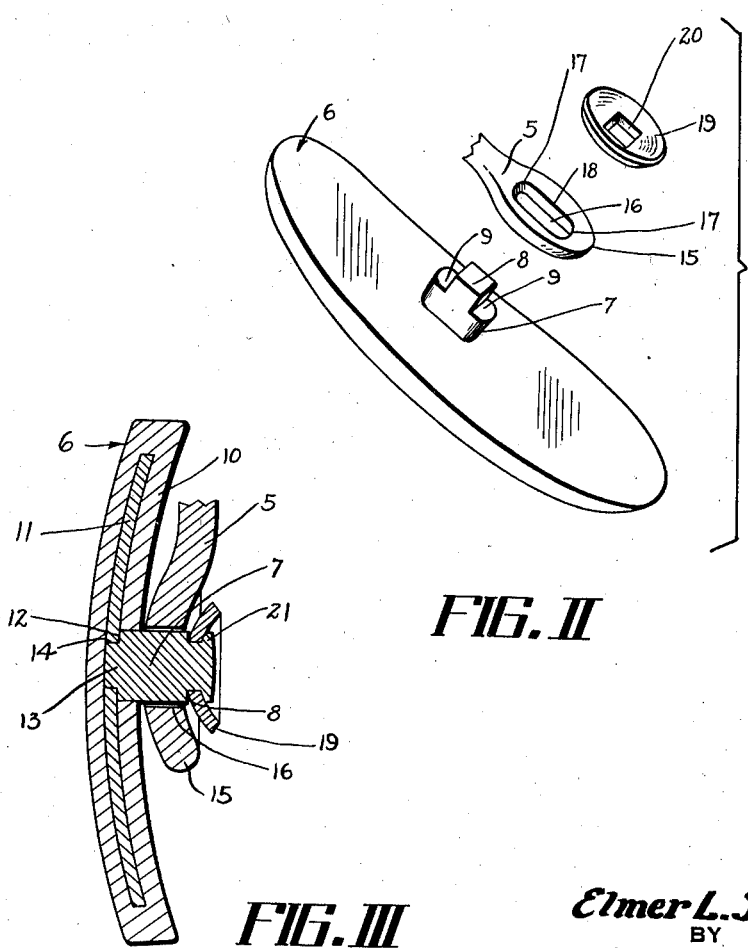
FIG. II
FIG. III
INVENTOR
Elmer L. Schumacher
BY
Harry H. Styll
ATTORNEY Patented May 9, 1939

2,157,247

UNITED STATES PATENT OFFICE 2,157,247

OPHTHALMIC MOUNTING

Elmer L. Schumacher, Southbridge, Mass., assignor to American Optical Company, Southbridge, Mass., a voluntary association of Massachusetts Application October 23, 1936, Serial No. 107,181

7 Claims. (Cl. 88—49)

This invention relates to improvements in ophthalmic mountings and has particular reference to improved connecting or securing means for uniting the parts of such mountings.

One of the principal objects of the invention is to provide improved means of attaching the nose bearing pads of ophthalmic mountings to the pad supporting parts of such mountings, whereby the pads may be quickly and easily assembled with the supporting parts and held in proper relation therewith and with a predetermined amount of looseness and play.

Another object is to provide improved means for connecting the parts of an ophthalmic mounting, whereby the parts may be connected with predetermined looseness therebetween, or without requiring special machinery which might necessitate that the operation be done at the place of manufacture of such mountings.

Another object is to provide a simple, efficient and economical nose pad and attachment which may be used in the trade in general repair work on ophthalmic mountings.

Other objects and advantages of the invention will become apparent from the following description taken in connection with the accompanying drawing and it will be understood that many changes may be made in the details of construction and arrangement of parts shown and described, without departing from the spirit of the invention as expressed in the accompanying claims. I, therefore, do not wish to be limited to the exact details of construction shown and described, as the preferred form only is shown by way of illustration.

Referring to the drawing:

Fig. I is a front view of an ophthalmic mounting embodying the invention;

Fig. II is a perspective view of a connection embodying the invention and showing the parts disengaged; and Fig. III is a sectional view through one of the assembled connections.

Ophthalmic mountings now in general use are provided with nose bearing pads loosely supported on the mountings so that they may be self-adjusting to the nasal contour of the patient, so that the mounting will rest comfortably upon the nose.

In the prior art where it was desired to connect the nose bearing pads to their supporting parts on an ophthalmic mounting with sufficient looseness to enable them to be self-adjusting to the nose of the wearer, much difficulty was encountered in obtaining the amount of looseness and play desired while at the same time maintaining the nose bearing pads in proper positional relation with their supporting parts. This difficulty was due primarily to the fact that in most instances in the past, the nose bearing pads were provided with a projection which extended through an opening in the pad support of the mounting and which was headed over to connect the pad to such support. As the projection did not provide any way of fixing the distance between the adjacent face of the nose bearing pad and its support, except with special factory equipment, there was no convenient way for anyone outside of the factory to properly attach the nose bearing pads to their support. In some instances, one part would be exceptionally loose, while the pad engaging the opposite side of the nose would be relatively rigid, causing the mounting to rest wrongly on the face of the wearer with the result that the nose pad would cut into the flesh and hurt the wearer and fail to support the lenses in proper relation with the eyes. It, therefore, is one of the primary objects of this invention to provide improved means and method of connecting the parts supporting the nose bearing pads of an ophthalmic mounting so that they will have a predetermined amount of looseness and play whereby all of such connections may be made uniform without the need of special machinery or equipment.

Referring more particularly to the drawing wherein like characters of reference designate like parts throughout the several views, the ophthalmic mounting embodying the invention comprises a pair of lens rims 1 connected by a bridge member 2 and having temple supports 3 to which the temples 4 are pivotally attached in the usual prior art manner.

Attached to each of the lens rims 1 adjacent the connections of the bridge member to said lens rims are supporting members or arms 5 to which the nose bearing pads 6 are attached.

The nose bearing pads 6 are provided, as shown in Figures II and III, with an oblong stud projection 7 having a reduced end 8 and shouldered portions 9. The stud 7 in this particular instance extends through the outer nonmetallic rear wall 10 of the pad 6 and is rigidly attached to an inner metallic plate 11. In this particular instance the stud is provided adjacent its attached end to the plate 11 with shouldered portions 12 and a reduced portion 13 fitting through an opening 14 in said plate. When the stud 7 is in assembled relation with the plate 11 it is preferably soldered or otherwise secured thereto, this operation being performed prior to placing the non-metallic covering 10 over the opposed surfaces of the inner plate 11.

The supporting members or arms 5 are preferably provided with an enlarged end 15 having an oblong slot 16 formed therein. The slot 16 is shaped to receive the stud 7 which is adapted to fit loosely therein. The said stud and slot are elongated so as to prevent side twisting of the nose bearing pad 6 relative to the supporting arm 5 by an amount greater than the play allowed between said parts.

It will be noted that the sides of the stud are curved to fit the curved ends 17 of the slot. The ends 17 are curved so as to allow more material surrounding the slot, particularly adjacent the ends 17. Should the ends 17 be formed square with a slot of the same width there would be a danger of the said square ends unduly reducing the thickness of the material adjacent said ends. By forming the ends 17 curved, this difficulty is overcome. This allows the use of a relatively large stud without reducing the strength of the end supporting said stud.

To attach the nose bearing pad 6 to the supporting arm 5 the stud 7 is inserted through the opening 16 so that the reduced extension 8 and shouldered portions 9 extend beyond the surface of the member 5 a predetermined amount.

In this particular instance, the predetermined amount is only sufficient to allow the looseness and play desired between the nose bearing pad and the supporting arm 5 so that the said pad when in attached relation with the arm will be free to move and fit itself to the nasal requirements of the wearer.

It will be noted that the extension 8 is preferably formed square and that a washer 19 having an opening 20 of a square outline is adapted to be fitted on the projection 8 with the inner face thereof engaging the shouldered portions 9. The end 21 of the projection 8 is then headed over to secure the washer 19 to the stud. The washer 19 serves as retaining means for holding the parts in assembled relation with each other while allowing the predetermined looseness to exist between said parts.

It will be observed that by changing the length of the stud 7 between the shouldered portions 9 and the adjacent surface of the nose bearing pad 6 and by changing the size of the opening 16, the amount of looseness and play between the parts may be changed.

By making the intermediate portion of the stud 7 of a standard length and controlled size and also by controlling the size of the opening 16, the amount of looseness and play between the parts will be consistent in all instances, that is, some will not be more loose or more rigid than others as has been usual in the past.

While the nose bearing pad 6 has been described as comprising a metal inner plate 11 having a non-metallic covering thereon it will be understood that the said pads may be formed wholly of metal or of any desired material. The only essential feature is that the length of the stud 7 be made the same and be so controlled as to allow a predetermined looseness and play between the parts when they are in assembled relation with each other. With the present construction it is apparent that there will be no danger of unduly reducing the length of the stud during the heading over of the end thereof. This is due to the fact that the washer 19 engages the shoulders 9 on the stud and that it is only the end of the reduced portion 8 which is headed over.

The arms 5 are preferably formed of pliable material and are of sufficient length to permit a wide range of adjustment of the nose bearing pads 6, that is, so that they may be raised or lowered or moved in or out relative to the lens supporting rims 1. Although the arms are pliable, they are sufficiently rigid to retain the nose bearing pads in adjusted positions during use.

Although the reduced end 8 and opening 20 are shown as being square in outline, it is to be understood that they may be formed to many different shapes.

From the foregoing description it will be seen that simple, efficient and economical means and method of obtaining all of the objects and advantages of the invention have been provided.

Having described my invention, I claim:

1. In an ophthalmic mounting, a nose bearing pad having a stud projecting from one side thereof, said stud having a main body portion and a reduced extension, a supporting arm for said pad provided adjacent its end with an opening through which the main body portion of the stud is adapted to extend and means on said reduced extension in engagement with the main body of the stud at a distance from the pad greater than the thickness of the arm for securing the pad on said arm.

2. In an ophthalmic mounting, a nose bearing pad having a stud projecting from one side thereof formed with a shouldered portion and a reduced extension, a supporting arm for said pad provided adjacent its end with an opening through which the stud is adapted to extend and means on said reduced extension in engagement with the shouldered portion at a distance from the pad greater than the thickness of the arm for securing the pad on said arm.

3. In an ophthalmic mounting, a nose bearing pad having an oblong stud projecting from one side thereof, said stud having a shouldered portion and a reduced extension, a supporting arm for said pad provided adjacent its end with an oblong opening through which the oblong stud is adapted to extend and means on said reduced extension in engagement with the shouldered portion at a distance from the pad greater than the thickness of the arm for securing the pad on said arm.

4. In an ophthalmic mounting, a nose bearing pad having an oblong stud projecting from one side thereof, said stud having a shouldered portion and a flat sided reduced extension, a supporting arm for said pad provided adjacent its end with an oblong opening through which the oblong stud is adapted to extend and means having an opening therein shaped to fit on the flat sided reduced extension and being secured thereto at a distance from the pad greater than the thickness of the arm to hold the pad on the arm.

5. In an ophthalmic mounting, a nose bearing pad having a stud projecting from one side thereof, said stud having a shouldered portion and a reduced extension, a supporting arm for said pad provided adjacent its end with an opening through which the stud is adapted to extend and a washer member fitted and secured on said reduced extension at a distance from the pad greater than the thickness of the arm for holding the pad on said arm.

6. In an ophthalmic mounting, a nose bearing pad member, a supporting arm member for said bearing pad member, one of said members having a stud projecting therefrom formed with a shouldered portion at a distance from said member greater than the thickness of the other of said members and with a reduced extension and the other of said members having an opening therein through which the stud is adapted to extend and means secured on said reduced extension in engagement with the shouldered portion for attaching the nose bearing pad member to said supporting arm member.

7. In an ophthalmic mounting, a nose bearing pad member, a supporting arm member for said bearing pad member, one of said members having a projection thereon formed with a body portion of a given length normally greater than the thickness of the other of said members and with a reduced extension and the other of said members having an opening therein through which the body portion and the reduced extension is normally adapted to extend and attaching means secured on said reduced extension and in engagement with the adjacent end of the main body portion for attaching the nose bearing pad member to said supporting arm member.

ELMER L. SCHUMACHER.